US005510682A

United States Patent [19]
Park

[11] Patent Number: 5,510,682
[45] Date of Patent: Apr. 23, 1996

[54] MAGNETISM-ERASING CIRCUIT FOR USE IN CATHODE RAY TUBES USING A D-C POWER SUPPLY

[75] Inventor: Tae-Jung Park, Seoul, Rep. of Korea

[73] Assignee: Hyundai Electronics Industries Co., Ltd., Kyonggi-Do, Rep. of Korea

[21] Appl. No.: 361,740

[22] Filed: Dec. 22, 1994

[30] Foreign Application Priority Data

Dec. 27, 1993 [KR] Rep. of Korea .................. 93-29758

[51] Int. Cl.⁶ .................................................. H01J 29/56
[52] U.S. Cl. ........................ 315/370; 315/8; 361/150
[58] Field of Search ........................ 315/370, 8, 85; 361/150

[56] References Cited

U.S. PATENT DOCUMENTS 5,093,755  3/1992  Hartmann et al. .................. 361/150
5,264,478  11/1993  Kim et al. .

*Primary Examiner*—Theodore M. Blum
*Attorney, Agent, or Firm*—Bryan Cave; David M. Klein

[57] ABSTRACT

A magnetism-erasing circuit for use in cathode ray tubes of portable televisions or the like for erasing the magnetism from the cathode ray tubes is disclosed. The magnetism-erasing circuit includes: a) automatic trigger for an automatically generating trigger signals when a D-C supply is initially applied to the magnetism-erasing circuit, b) trigger detecting means, c) delay and second trigger means for generating second trigger pulses which are delayed by a specified time interval by the detected trigger signals from the trigger detecting means, and d) means for controlling the driving of the magnetism-coil by applying currents to a magnetism-erasing coil. The magnetism-erasing circuit of the present invention further includes manual trigger means for manually generating trigger signals under the condition where a D-C supply has already been applied to the circuit.

8 Claims, 3 Drawing Sheets

FIG. 4
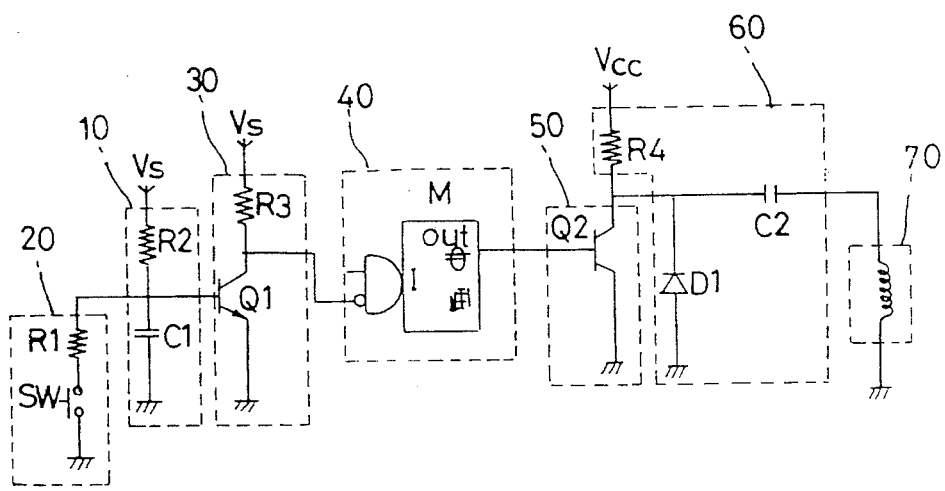
FIG. 5A
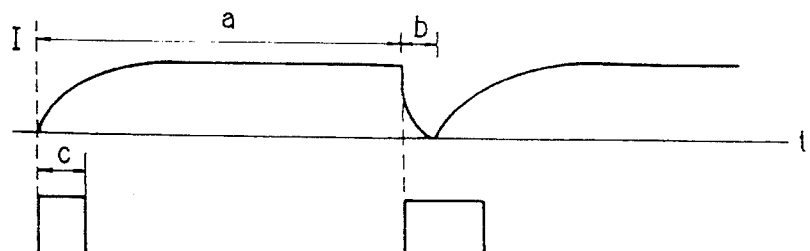
FIG. 5B
FIG. 5C
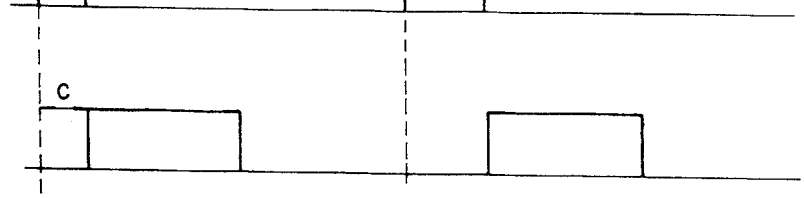

MAGNETISM-ERASING CIRCUIT FOR USE IN CATHODE RAY TUBES USING A D-C POWER SUPPLY

BACKGROUND OF THE INVENTION

1. Field of the Invention

This invention relates to a magnetism-erasing circuit for use in cathode ray tubes, and more particularly to a magnetism-erasing circuit for erasing the magnetism from metal structures of cathode ray tubes or from the shadow masks of the cathode ray tubes, whereby mislanding of the electron beams on the cathode ray tubes or the shadow masks of the cathode ray tubes is prevented.

2. Description of the Conventional Art

Generally, when power is initially turned off and then re-applied, with a beam of electrons being projected on cathode ray tubes of televisions or monitors, the beam of electrons emitted by electron guns cannot be focused to a predetermined area on the fluorescent screens since the metal structures in the cathode ray tubes are magnetized. That is, the beam of electrons is mislanded on the fluorescent screen in the cathode ray tubes.

Magnetism-erasing circuits are generally provided to prevent this mislanding. For this purpose, predetermined magnetism-erasing currents flow through magnetism-erasing coils which are wound around the panels of the cathode ray tubes for generating magnetic fields, whereby the magnetism of the metal structures are erased.

FIG. 1 shows a conventional magnetism-erasing circuit wherein alternating current is used. In conventional magnetism-erasing circuits, when an A-C supply is initially applied to the conventional magnetism-erasing circuit, temporary large currents will flow through a magnetism-erasing coil 70 via a posistor resistance R2 and less currents will flow through posistor resistance R1 (R1>R2). Since the resistances R1 and R2 are posistors, their resistance values are increased suddenly as current flows. After a few seconds, the resistance values become hundreds of KΩ. Accordingly, currents of waveforms as shown in FIG. 2 will flow through the magnetism-erasing coil 70, causing the magnetism to be erased from the metal structures.

Conventional magnetism-erasing circuits have a drawback that only an A-C supply may be used. Accordingly, the conventional art magnetism-erasing circuit cannot be used in portable televisions or instruments in which an A-C supply is not used or is unavailable.

SUMMARY OF AN INVENTION

It is therefore the object of the present invention to provide a magnetism-erasing circuit for use in erasing the magnetism of ray tubes of portable television, etc. using direct current as a driving supply.

The magnetism-erasing circuit for use in the cathode ray tubes according to the present invention, is provided with a magnetism-erasing coil and comprises; a) automatic trigger means for automatically generating trigger signals when a D-C supply is applied to the circuit, b) trigger detecting means for detecting the trigger signals of the automatic trigger means, c) delay and second trigger means for generating second trigger pulses which are delayed by a specified time interval, depending on said trigger signals of the trigger detecting means, d) switch means which is operated and controlled by said second trigger pulses of said delay and second trigger means, and e) means for controlling the driving of said magnetism-coil, the magnetism-coil driving control means being controlled by the outputs of said switch means.

Preferably, the magnetism-erasing circuit of the present invention includes manual trigger means which is connected to the automatic trigger means for manually generating trigger signals such as by remote control when an D-C supply is applied to the magnetism-erasing circuit.

BRIEF DESCRIPTION OF THE DRAWINGS

This and other objects, features and advantages of the present invention will be more clearly understood from the following detailed description taken in conjunction with the accompanying drawings, in which:

FIG. 4 is a detailed schematic of the magnetism-erasing circuit of FIG. 3;

FIG. 5A is a view showing the waveform of currents of trigger signals generated by an automatic trigger of FIG. 4, according to the teachings of the present invention;

FIG. 5B is a view showing the waveform of currents of trigger signals generated by a trigger detector of FIG. 4, according to the teachings of the present invention; and FIG. 5C is a view showing the waveform of currents of trigger pulses generated by a delay and second trigger of FIG. 4, according to the teachings of the present invention.

DETAILED DESCRIPTION OF THE PREFERRED EMBODIMENT

Figure 3:
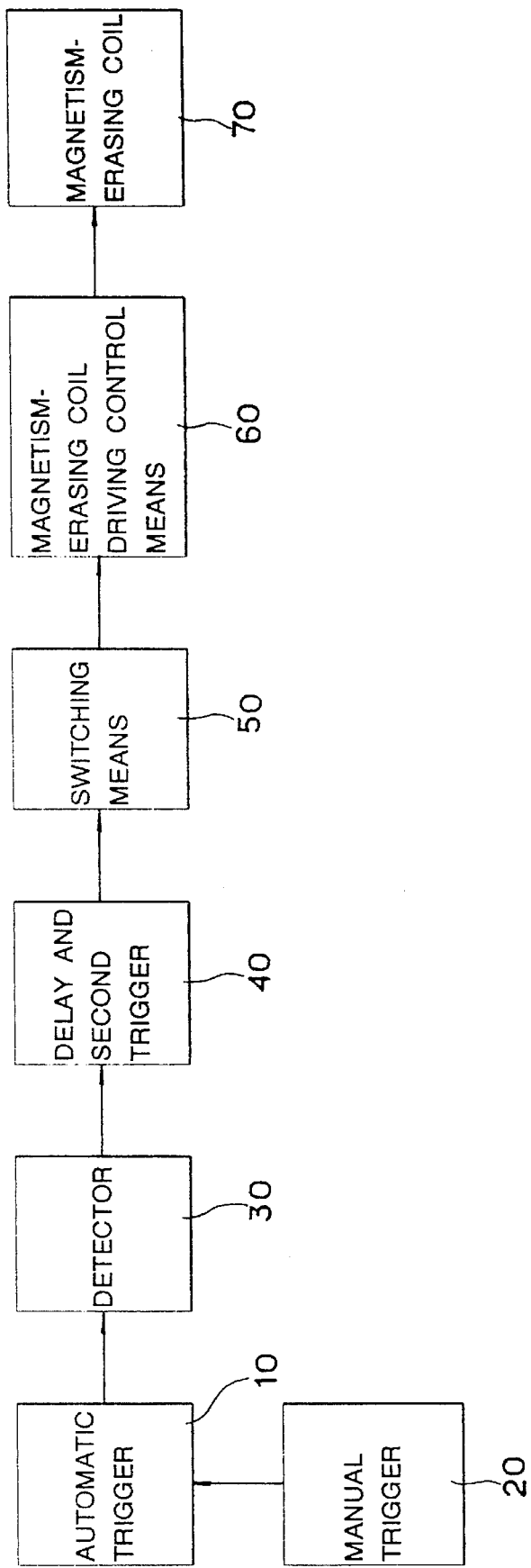
FIG. 3 is a block diagram of a magnetism-erasing circuit according to the present invention for use in a cathode ray tube, using direct current.

FIG. 3 is a block diagram of the magnetism-erasing circuit according to the present invention. As shown, the magnetism-erasing circuit using direct current for use in a cathode ray tube comprises; a) automatic trigger means 10 for automatically generating trigger signals when a D-C supply is applied to the magnetism-erasing circuit, b) manual trigger means 20 connected to the automatic trigger means 10 for manually generating trigger signals, as by remote control, when an D-C supply is applied to the circuit, c) trigger detecting means 30 for detecting the trigger signals from the automatic trigger means 10 or the manual trigger means 20, d) delay and second trigger means 40 for generating second trigger pulses which are delayed by a predetermined time interval which is required for initializing magnetism-erasing coil driving control means 60, depending on the detected trigger signals from the trigger detecting means 30, e) switch means 50 which is operated and controlled by the second trigger pulses from the delay and second trigger means 40, and f) means for controlling the driving of the magnetism-coil 60 which is controlled by the outputs of the switching means 50 and provided adjacent the panels of the cathode ray tube for reducing or eliminating the mislanding of the beam of electrons emitted by an electron gun (not shown).

FIG. 4 is a detailed schematic of the magnetism-erasing circuit of FIG. 3. The automatic trigger means 10 consists of a resistor R2 and a capacitor C1 which are connected together in series between ground and a D-C power supply "Vs". The manual triggering means 20 consists of a resistor R1 which is connected to the contact between the resistor R2 and the capacitor 1 of the automatic trigger means 10, and a switch SW which is connected between the resistor R1 and ground.

The trigger detecting means 30 consists of a transistor Q1 the base of which is connected to the outputs of the automatic trigger means 10 and the manual trigger means 40, and a resistor R3 which is connected between the collector of the transistor Q1 and the D-C supply. The delay and second trigger means 40 consists of a monostable multivibrator M to which is connected through an inventor to the output of the trigger detecting means 30. The switching means 50 consists of a switching transistor Q2, the base of which is connected to the output of the delay and second trigger means 40.

The magnetism-coil driving control means 60 consists of a resistance R4 which is connected between the output terminal of the switching means 50 and a second D-C supply of 100 V "Vcc", a damping diode D1 which is connected between the output terminal of the switching means 50 and ground, and a capacitor C2 which is connected between the output terminal of the switching means 50 and a magnetism-erasing coil.

In operation, when the D-C supply "Vs" is applied to the magnetism-erasing circuit of the present invention, an integrating circuit constituted by the resistor R2 and the capacitor 10 of the automatic trigger means 10 will cause an integrating voltage or trigger voltage to be applied to the base of the transistor "Q1" of the trigger detecting means 30. The integrating or trigger voltage refers to the voltage which is changed from "LOW" to "HIGH" as time goes by, as shown in FIG. 5A. During "C" (see FIG. 5B) in which the base voltage of the transistor Q1 is "LOW", the transistor Q1 is held "OFF". When the base voltage is high, the transistor Q1 is turned on. Accordingly, trigger pulses as shown in FIG. 5C are generated by the collector of transistor Q1.

The trigger pulses of the trigger detecting means 30 are applied to a reversal input terminal I of the monostable multivibrator M of the delay and second trigger means 40. The monostable multivibrator M generates a second trigger pulse through the output terminal "out", as shown in FIG. 5C, during the falling of the trigger pulse of the trigger detecting means 30 when the trigger pulse of the trigger detecting means 30 is changed from "HIGH" to "LOW". Accordingly, the second trigger pulse which is delayed by a predetermined time interval "C", is obtained. The delayed time interval "C" is established in consideration of the charge time period in which the capacitor C2 of the magnetism-erasing coil driving control means 60 is charged sufficiently.

When the second trigger pulse shown in FIG. 5C, is applied to the transistor Q2 of the switching means 50, the transistor Q2 is turned on, which causes the magnetism-erasing coil 70, the condenser C2 and the transistor Q2 to constitute a closed circuit. Accordingly, a resonance circuit is constituted by the capacitor C2 and the magnetism-erasing coil 70, causing resonance currents to flow through the magnetism-erasing coil 70, whereby the magnetism will be erased from the cathode ray tube.

Figure 1:
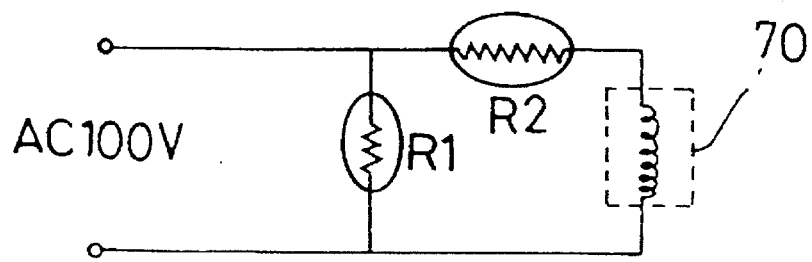
FIG. 1 is a schematic of a magnetism-erasing circuit of the prior art for use in a cathode ray tube, using alternating current.
Figure 2:
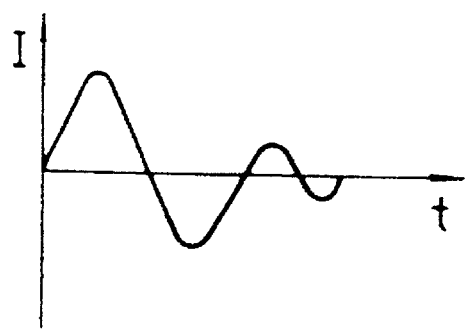
FIG. 2 is a view showing the waveform of currents flowing through a magnetism-erasing coil of the magnetism-erasing circuit of the prior art in FIG. 1.

The period for the second trigger pulse is established in consideration of the magnetism-erasing time period required for erasing the cathode ray tube. The damping diode D1 of the magnetism-erasing coil driving control means 60 performs no function in a closed loop where the resonant currents flow through the magnetism-erasing coil 70, the capacitor C2, and the transistor Q2. In contrast, when the resonance currents flow inversely, the damping diode D1 serves as a current path to the capacitor C2 from around. Furthermore, the damping diode D1 serves as a damper for decreasing the resonance currents as time goes by, whereby the waveform of the magnetism-erasing current as shown in FIG. 2 will be obtained.

When it is necessary to erase the magnetism from the cathode ray tube in a normal condition where direct current has already been applied to the cathode ray tube and the cathode ray tube is under operating condition, the switch SW of the manual trigger means 20 is operated as by remote control. When the switch SW is on, the electric charge in the capacitor C1 is discharged to the ground through the switch SW as shown by "b" of FIG. 5A. Thereafter, when the switch SW is off again, the magnetism-erasing circuit is operated in the same way as when direct current is initially applied, whereby the magnetism-erasing current of FIG. 2 will flow through the magnetism-erasing coil 70. For this purpose, the switch SW should be one which is capable of being turned on temporarily and then off. The current waveforms which occur during on and off activity of the switch are shown toward the right in FIG. 5A to FIG. 5C.

As described above, the magnetism-erasing circuit of the present invention is useful for portable televisions, instruments, or the like using direct current, for erasing the magnetism of the cathode ray tube, whereby mislanding of the beam of electrons will be prevented. Furthermore, even in a normal state where the cathode ray tube is in operation, the magnetism-erasing function can be performed as by remote control. In addition, the use of the monostable multivibrator facilitates easy adjustment of the time for erasing magnetism from the cathode ray tube.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. A magnetism-erasing circuit for a cathode ray tube, the cathode ray tube comprising a magnetism-erasing coil, the magnetism-erasing circuit being powered by a D-C power source, the magnetism-erasing circuit comprising:

a) trigger means for automatically generating a trigger signal when the D-C power source is applied to the magnetism-erasing circuit;

b) trigger detecting means for detecting the trigger signal from the automatic trigger means and for generating a first trigger output signal responsive thereto;

c) delay and second trigger means for generating a second trigger output signal that is time delayed by a predetermined time interval from the trigger signal;

d) switch means which operates responsive to the second trigger output signal from the delay and second trigger means; and e) means for controlling the driving of the magnetism-erasing coil, the magnetism-erasing coil driving control means being controlled by the switching means for causing current to flow through the magnetism-erasing coil for generating a magnetism-erasing magnetic field;

wherein the trigger means, the trigger detecting means, the delay and second trigger means, the switch means, and the means for controlling the driving of the magnetism-erasing coil are each powered by the D-C power source.

2. The magnetism-erasing circuit according to claim 1, wherein the trigger means comprises an integrating circuit comprising a resistance and a condenser connected in series between ground and the D-C power source.

3. The magnetism-erasing circuit according to claim 1, further comprising a manual trigger switch for manually generating a trigger signal detectable by the trigger detecting means.

4. The magnetism-erasing circuit according to claim 1, wherein the trigger detecting means comprises a transistor which is controlled by the trigger signal generated by the automatic trigger means.

5. The magnetism-erasing circuit according to claim 1, wherein the delay and second trigger means comprises a monostable multivibrator to which is inversely input the first trigger output signal.

6. The magnetism-erasing circuit according to claim 1, wherein the switching means comprises a switching transistor which is controlled by the second trigger output signal.

7. The magnetism-erasing circuit according to claim 1, wherein the magnetism-erasing coil driving control means comprises a damping diode which is connected between an output terminal of the switch means and ground, and a condenser which is connected between an output terminal of the switch means and the magnetism-erasing coil.

8. A magnetism-erasing circuit for a cathode ray tube, the cathode ray tube comprising a magnetism-erasing coil, the magnetism-erasing circuit comprising:

a) a D-C power supply;

b) trigger means powered by the D-C power supply which generates an integrating voltage signal when i) the D-C power supply is applied to the magnetism-erasing circuit or ii) a manual switch is activated;

c) trigger detecting means powered by the D-C power supply which receives the integrating voltage signal and which generates an output pulse at predetermined levels of the integrating voltage signal;

d) delay and second trigger means powered by the D-C supply, the delay and second trigger means receiving the output pulse and generating a second output pulse that is delayed a predetermined amount of time from the time that the D-C power supply is applied to the magnetism-erasing circuit or the manual switch is activated;

e) switch means powered by the D-C supply which operates responsively to the second output pulse; and f) a magnetism-erasing coil driving circuit powered by the D-C supply, the switch means causing current to flow through the magnetism-erasing coil driving circuit for generating a magnetism-erasing magnetic field in the cathode ray tube.

* * * * *